March 21, 1939.    J. J. BLACK    2,151,633
TRAILER OR TRUCK CHASSIS AND BODY
Filed April 8, 1937
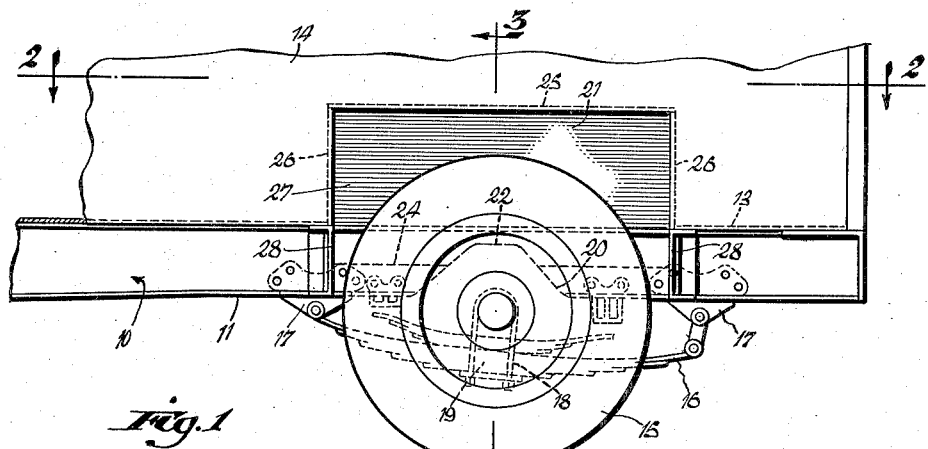
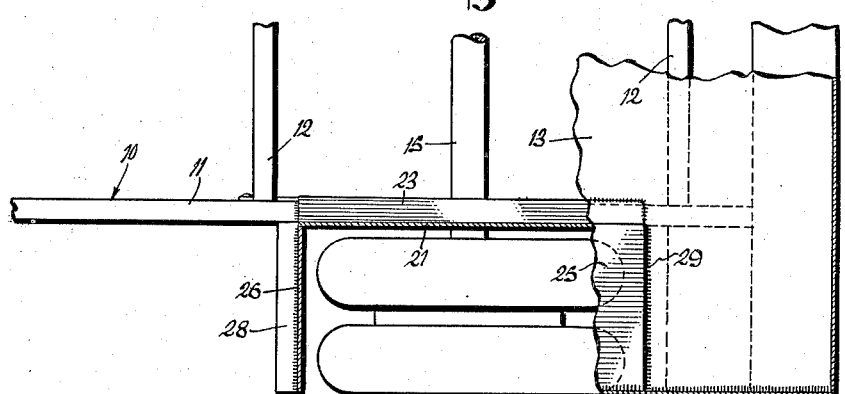
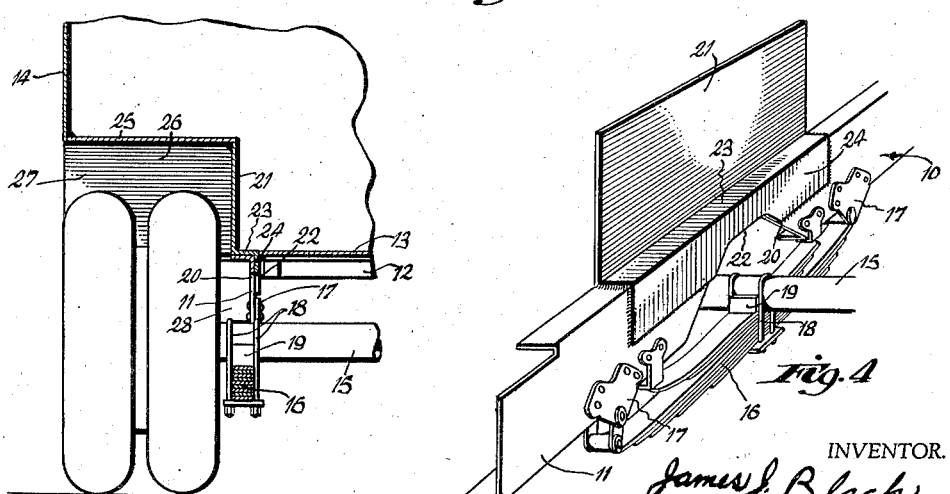
INVENTOR.
James J. Black
BY Wood & Wood ATTORNEYS Patented Mar. 21, 1939

2,151,633

UNITED STATES PATENT OFFICE 2,151,633

TRAILER OR TRUCK CHASSIS AND BODY

James J. Black, Cincinnati, Ohio, assignor to The Trailer Company of America, Cincinnati, Ohio, a corporation of Delaware Application April 8, 1937, Serial No. 135,764

4 Claims. (Cl. 280—106)

This invention relates to trailers or trucks of the low suspension type, and is particularly directed to the construction of the body and chassis of the trailer or truck in relation to the rear axle.

The invention may be said to apply to any chassis and body structure which is lowered on the axle, thereby creating the problem of clearance between the axle and wheel unit and the body and chassis.

In order to mount the chassis and body of a trailer or truck of low suspension it is necessary to provide clearance for axle movement into the plane of the chassis. This requires either humping of the chassis side rails or notching thereof. Notching is desirable since the operation is less expensive, the body structure fits better, and the channels or side rails are more standard. However, notching tends to weaken the side rails due to the removal of metal in or about the region of greatest strain.

Furthermore, in lowering the chassis and body in this manner it is necessary to provide clearance for the wheels with respect to the body, since in any standard body structure the body overhangs the wheels.

It has been the objective of the present invention to provide a chassis and the body structure of the low suspension type wherein the side rails of the chassis are notched out to provide the necessary axle clearance, but due to the attachment and arrangement of certain of the body members the side rails are made stronger and more rigid than they would ordinarily be.

Accordingly, the invention may be said to reside in the fundamental idea and provision of a body and chassis structure which affords a housing for the wheels at each side of the trailer or truck and which in the association and attachment of this housing with the chassis and body, bridges or reinforces the cutaway portions of the side rails. The result is a more rigid chassis structure than heretofore provided and an efficient housing of the wheels in a body and chassis structure of low suspension.

Other objects and certain advantages will be more fully apparent from a description of the accompanying drawing:

Figure 1 is a side elevation of the rear portion of a trailer incorporating the wheel housing and chassis or frame structure of this invention.

Figure 2 is a sectional view taken on line 2—2, Figure 1.

Figure 3 is a sectional view taken on line 3—3,
Figure 1, disclosing the wheel housing of this invention in relation to the wheel.

Figure 4 is a perspective view illustrating the attachment of the back plate of the wheel housing relative to the chassis of the trailer.

Referring specifically to the drawing the chassis or frame of the trailer is indicated generally at 10. The chassis is made up of longitudinal channel members 11 and transverse or cross members 12 supporting the floor 13 and body 14.

The rear axle and wheels indicated at 15, yieldingly support the chassis through the medium of springs 16. The springs are shackled in brackets 17 mounted against the under side of the longitudinal channels 11 in the usual manner. As shown in the drawing, the springs are underslung on the axle for the purpose of lowering the trailer with relation to the rear axle.

The springs are fastened to the rear axle by means of U-bolts 18. The U-bolts encircle the upper portion of the tubular axle. Their lower ends are provided with nuts for rigidly sustaining the springs therebeneath as shown in Figures 3 and 4. The spring mounting shown is of the standard type employed for the purpose of lowering the chassis on the axle and therefore in relation to the roadway. The height of the trailer chassis is somewhat determined by the thickness of the spring seat 19 placed between the axle and the spring.

In the trailer structure disclosed, the trailer may be lowered to the extent of 9 inches by the underslung spring mounting. The lowering of the trailer is of advantage in that it lowers the center of gravity and stabilizes the vehicle, making possible a higher speed and a decrease in the tendency of the trailer to upset or sway on curved or rough roads and for convenience in loading or unloading.

The lowering of the frame and body as disclosed requires that clearance be provided between the chassis and axle to accommodate for spring action. For this purpose the channel members 11 are cut out as at 20 an amount to compensate for the lowering of the frame. These cut-out or clearance portions are of a width to provide clearance on each side of the axle. The two sides of each cut are at an angle or converge toward the tops of the notches to reduce the amount of material cut away. The clearance space is formed in the lower portion of the channel and extends upwardly about two-thirds the distance toward the top of the channel, leaving a section of the channel intact for fastening purposes as hereinafter disclosed.

The manner of providing clearance between the frame and axle as disclosed, considerably weakens the longitudinal channels at the rear portion of the chassis. Each wheel housing is applied to the frame at this area and by its construction and attachment reinforces the frame at this point. The wheel housing, designed to strengthen the frame and to provide clearance for the wheels in the body comprises a rectangular back plate 21 in each instance, welded to the inside of the channel above the clearance portion. It constitutes an upward continuation of the channel. This construction is adapted to provide strength at this point as the plate 21 lying against the top flange of the channel extends considerably beyond the cut-out portion of the channel on each side to act as a bridge, thereby absorbing the stresses which are concentrated at the cut-out portion of the channel.

The plate is cut out at 22, to conform with the configuration of the channel at the notched portion and is welded to the channel along its side edges. As shown in Figures 3 and 4, the plate 21 is bent angularly at the top of the channel to form a flange 23 lying flush on the top of the channel and another flange 24 at the inner side of the channel to carry the plate downwardly flush with the inner face of the channel.

In brief, the structure includes notches in a portion of the frame of the trailer to accommodate the underslung axle, and a wheel housing arranged in such a manner as to compensate for the loss in strength of the side channels at the notched portions. Thus the wheel housing serves a dual purpose, providing a closure for the wheels and at the same time strengthening the frame.

The plate projects upwardly a sufficient distance to bring its upper edge above the wheels an amount substantially equal to the clearance between the axle and chassis and is of a length to project forwardly and rearwardly beyond the periphery of the wheels. A top plate 25 and side plates 26—26 are welded along the top and two end sides of the plate to box in the wheels as shown in Figures 2 and 3.

The wheel housings are built on the inside of the body or van, extending inwardly from the side walls a distance equal to the width of the wheels (dual in this instance) and in length a distance somewhat greater than the diameter of the wheels. The top of the wheel housing is sufficiently clear of the wheels to provide for springing of the wheels without danger of contact with the top. The housing comprises, in effect, a box on the inside of the body having the lower side open and may be closed on five sides or as shown in the drawing, open as at 27 to the outside.

The wheel housing constructed according to this invention provides an extremely rigid structure, the frame being greatly strengthened above the axle by the construction disclosed. It may be seen that the load is concentrated in this area of chassis support. The top and side members of the housing greatly add to the strength of the housing. The lower edges may be fastened to extending side members 28 by welding as shown. The floor may be of metal and welded as shown at 29 around the lower edge of the housing to further increase the rigidity of the van or body.

Having described my invention, I claim:

1. Chassis and body construction comprising, a chassis having side rails and cross rails, the side rails notched out to provide axle clearance, an axle movable in said clearance, springs supporting the side rails on said axle, a vertically disposed plate attached to each side rail and bridging the notched out portion thereof, end plates extending laterally from each end edge of said plate, and a top plate secured to the top edges of the end plate and the vertically disposed bridging plate, said plates forming a wheel housing affording appropriate clearance for vertical movements of the body of the springs.

2. In combination with a chassis for a trailer or the like including the side rails of the chassis, a vertically disposed plate member attached to each side rail, said plate element constituting the back wall of a housing for the wheels of the chassis, said plate element including a horizontal flange secured to the top of the side rail and a vertically disposed flange attached to the inner face of the side rail, said rails respectively having axle clearance notches cut upwardly from their lower edges.

3. In a vehicle chassis, a continuous side rail member having a notched portion in its lower side for the reception of a wheel supporting axle, a housing including a vertical plate and enclosing the upper portion of the wheel, said housing secured to said side rail over said notch and extending to either side thereof, the parts being so constructed and arranged as to distribute the rail stresses to each side of the notch through the vertical plate.

4. A wheel chassis comprising side rails having notched-out portions in their undersides and a wheel housing for each side rail, said wheel housing including in each instance a vertical back panel secured to the particular rail bridging the notched portion thereof, said parts constructed and arranged so as to afford clearance for the wheel members supporting the chassis and stiffen the rails at the zones of the notches whereby the rail stresses are distributed to each side of the respective notches through the back panels.

JAMES J. BLACK.